United States Patent [19]
Duff et al.

[11] 3,843,189
[45] Oct. 22, 1974

[54] VEHICLE ASSEMBLY KITS

[75] Inventors: Peter James Duff, Poole; Denis Toomey, High Wycombe, both of England

[73] Assignee: Caravans International (motorised) Limited, Dorset, England

[22] Filed: Aug. 12, 1971

[21] Appl. No.: 171,145

[30] Foreign Application Priority Data
Aug. 14, 1970 Great Britain.................. 39333/70

[52] U.S. Cl........... 296/1 R, 296/23 MC, 296/28 C, 296/35 R
[51] Int. Cl............................................ B62d 27/00
[58] Field of Search........... 296/23 R, 23 MC, 35 R, 296/35 A, 28 R, 28 C, 28 K, 1 R; 52/211, 212, 461, 584

[56] References Cited
UNITED STATES PATENTS

| | | | |
|---|---|---|---|
| 2,765,884 | 10/1956 | Steffan.................. | 52/211 |
| 3,469,881 | 9/1969 | McNamee............... | 296/23 MC |
| 3,508,786 | 4/1970 | Colville.................. | 296/66 |
| 3,584,911 | 6/1971 | Coletto................... | 296/1 R |
| 3,638,991 | 2/1972 | Hathaway................ | 296/23 MC |

FOREIGN PATENTS OR APPLICATIONS

| | | | |
|---|---|---|---|
| 1,151,010 | 8/1957 | France................... | 296/28 C |
| 1,020,534 | 12/1957 | Germany................. | 296/28 C |

*Primary Examiner*—David Schonberg
*Assistant Examiner*—John A. Pekar
*Attorney, Agent, or Firm*—John P. Snyder

[57] ABSTRACT

For use in assembling enclosed vehicle bodies to vehicle chassis having a compartment thereon with an access opening between compartment and body interior, a kit of sealing parts comprising a make-up unit with parts for nesting snugly against contiguous faces of compartment and body to form a weather tight seal therebetween, clamping means for securing the make-up unit to compartment and body structures and a masking infill securable to the peripheral body with edges round the access opening.

4 Claims, 10 Drawing Figures

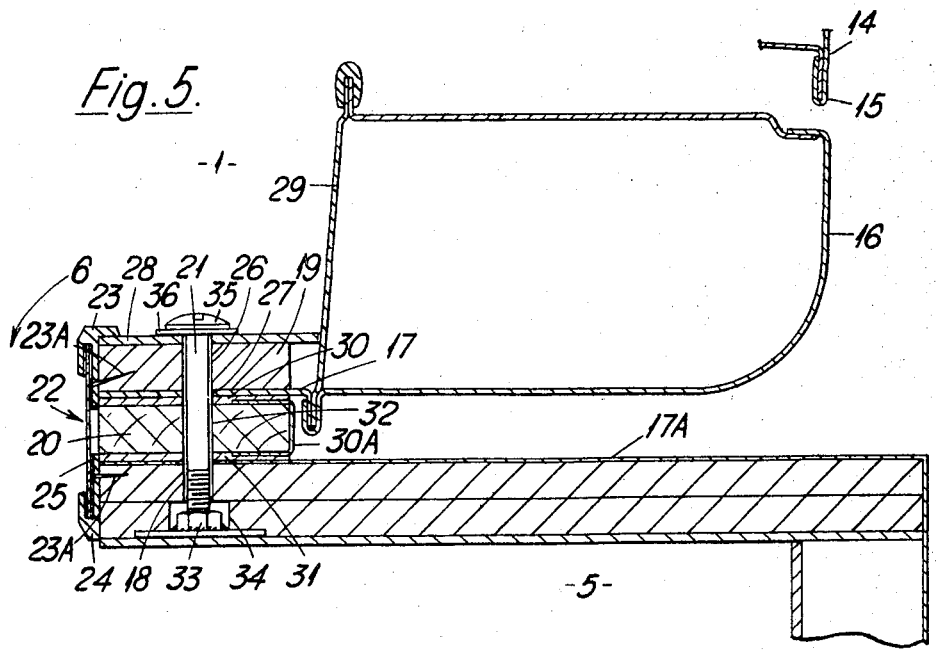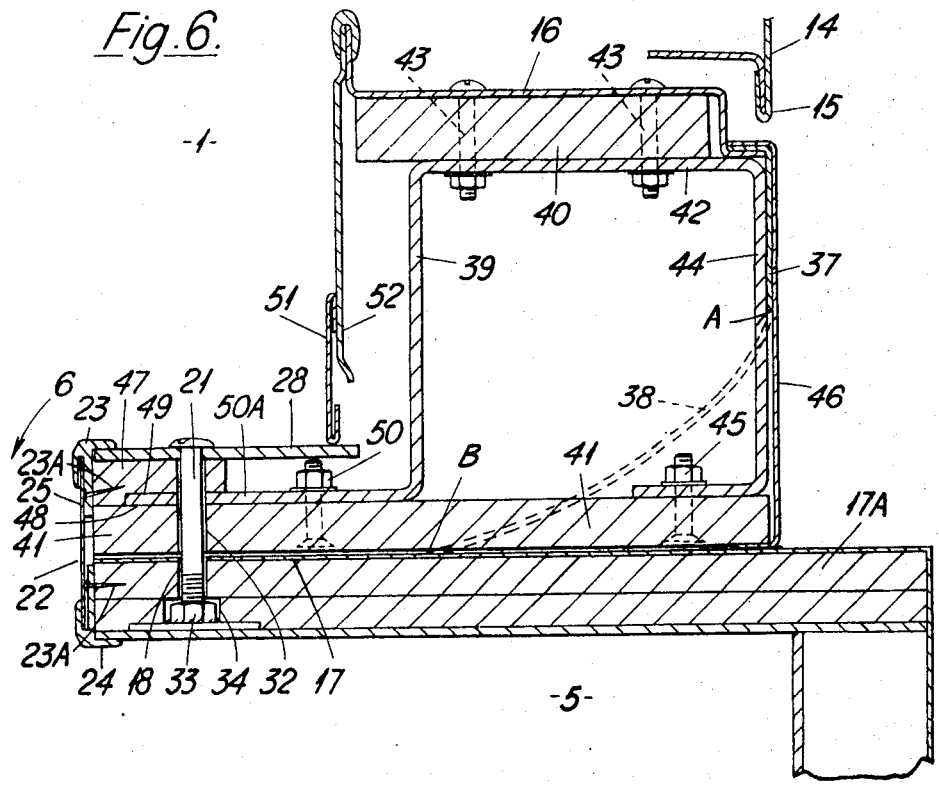

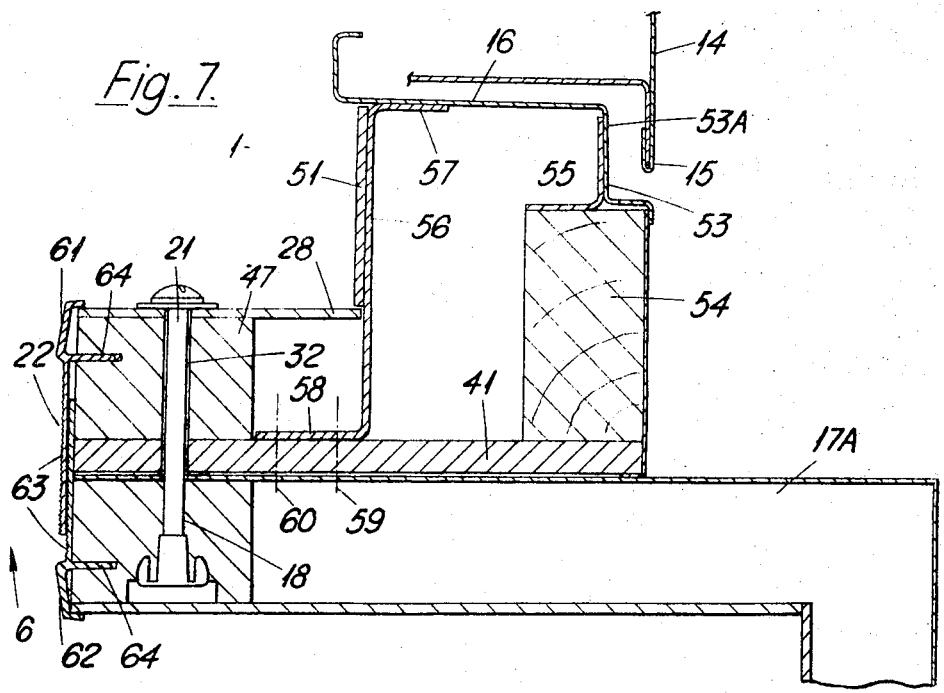
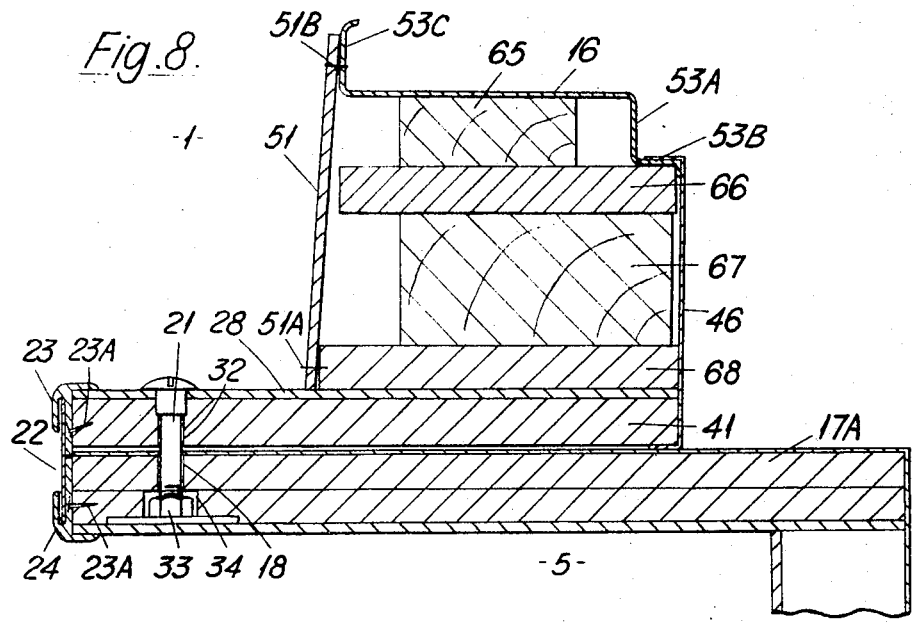

VEHICLE ASSEMBLY KITS

BACKGROUND OF THE INVENTION

1. Field of the Invention

This invention relates to a kit of parts for use in the assembly of vehicle bodies on vehicle chassis having a compartment at one end such as a driver's cab, and more particularly to vehicle assemblies in which the contiguous ends of chassis compartment and body have openings which in the assembled vehicle permit passage of the vehicle users or goods between the body and the compartment.

2. Description of Prior Art

Vehicle chassis and bodies of the known kind are frequently make by independent manufacturers and assembled by third parties. Vehicle chassis manufacturers have their own designs including the shape of the cab particularly the rear wall hereof: such cab rear walls can be substantially flat and upright or slightly inclined to the vertical or they may be curved along vertical or horizontal planes, the curves merging into the top and sides of the cab. The access opening in the cab rear wall may thus be in a part having a substantially flat or curved rear face which has to be married to the opening in the front end wall of the vehicle body which is usually substantially vertical and flat but may be curved. Since the length of the chassis behind the cab is determined by the chassis manufacture, the body manufacturer aims to utilize as much of the chassis length as possible and thus the distance between the body on the chassis and the rear of the cab must be a minimum and provide a sufficiently close fit to be weatherproof under all conditions of vehicle use.

The body manufacturers problem has hitherto been to provide a body which is of standard design to fit the different cab shapes produced by the different chassis manufacturers and meets the above requirements. The cabs of different manufacturers usually have an access door in one or both sides of the cab which close onto pillars or cab sections towards the rear of the cab sides and the position and configuration of these pillars or sections makes it difficult to fit the front end of the body thereto so as to be weathertight and to avoid substantial loss of space between the cab and the body assembled thereon.

The main object of the present invention is to provide a kit of parts which can be used in assembling the standard bodies onto any type of vehicle chassis and overcomes the aforesaid disadvantages.

SUMMARY

According to the present invention a kit for use in the assembly of a vehicle body on one of a number of vehicle chassis with compartments of different shape with access openings in the contiguous ends of said body and said compartment in register, a kit of parts comprising a make-up unit for disposition between said compartment and said body, said make-up unit having portions shaped on opposite faces to engage snugly against respective contours of the portions of said compartment and said body which bound the sides and top of said openings, slots in said make-up unit, a number of clamping devices each receivable in one of said slots to secure contiguous said body and compartment portions together with said make-up unit in weather-tight relationship, and a masking infill securable to the peripheral portions of said body, compartment and make-up unit round said access openings.

In one preferred construction the make-up unit includes a number of pieces each shaped to the contour of the vehicle portion they are to engage on the sides and top of said compartment and body adjacent said access openings and frame uprights at the sides of said body, said clamping device slots through each said piece said slots in different pieces being in register, and in register with holes in said compartment and said body.

In another construction a structural element is provided which is securable to the rear of said compartment upright to complete a rearwardly open portion thereof and form a portion completing the peripheral side and top portions of said access opening in said rear wall of said compartment, and at least one make-up piece shaped for engagement snugly against said structural element around said opening, said structural element having a number of clamping device slots therein each in register with such slots in said make-up piece.

The masking infill preferably comprises beadings securable to the edge corners of around said access openings in said compartment and said body, and a masking element securable to and extending between said beadings.

The invention also includes a vehicle formed by assembling a vehicle chassis and a body with a make-up unit of the present invention.

BRIEF DESCRIPTION OF THE DRAWINGS

In order that the invention may be more fully understood some embodiments in accordance therewith will now be described by way of example with reference to the accompanying drawings in which:

FIG. 5 is a horizontal cross-section of one side of the rear of the vehicle chassis cab and the front of the assembled body with a kit of the invention in position of one vehicle construction FIG. 6 is a cross-section similar to FIG. 5 of another vehicle construction;

FIG. 7 is a cross-section similar to FIGS. 5 and 6 of yet another vehicle construction;

FIG. 8 is a similar cross-section to FIG. 7 showing a modified construction;

DESCRIPTION OF PREFERRED EMBODIMENTS

Figure 1:
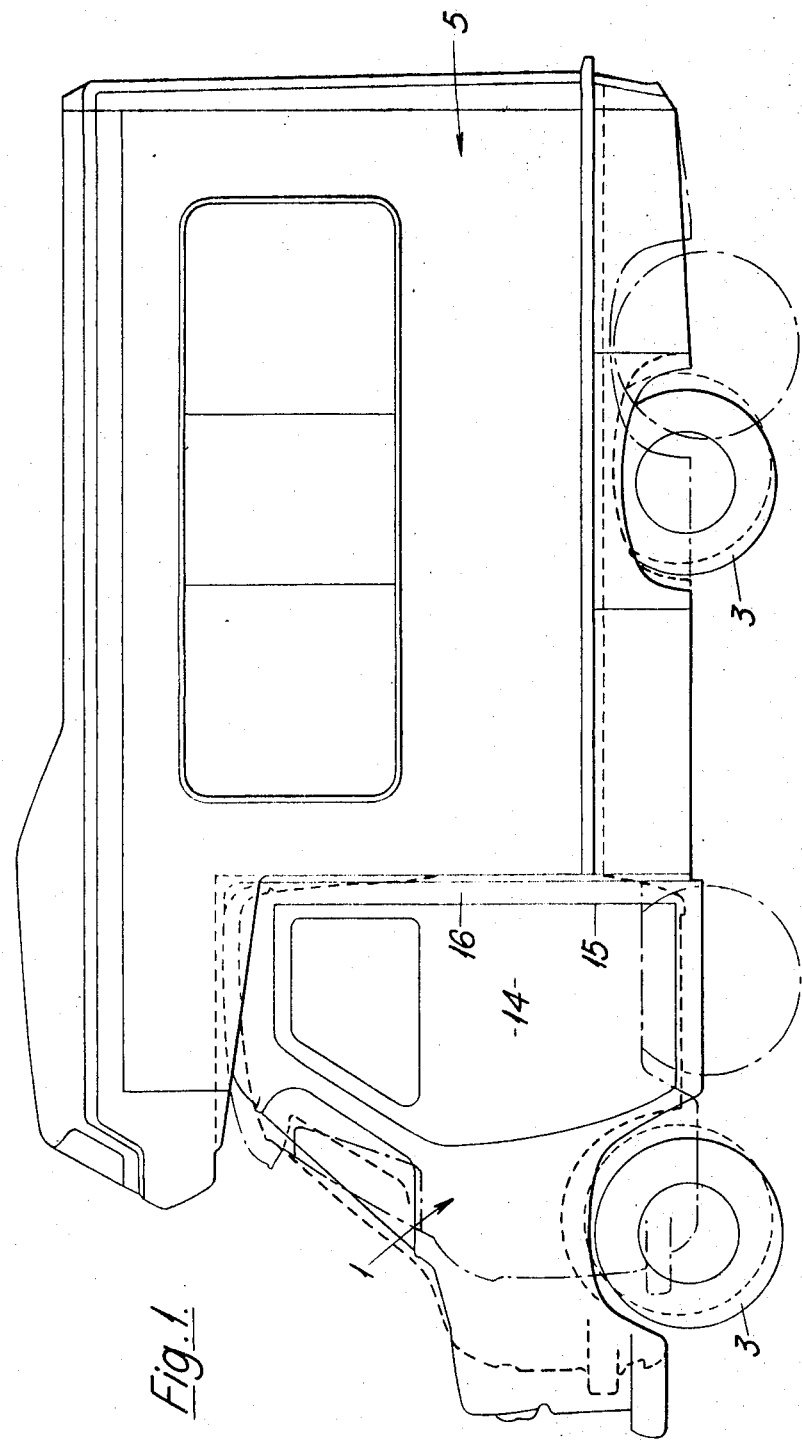
FIG. 1 is a side view of a vehicle chassis with a vehicle body assembled thereon, showing the outlines of the chassis of three different manufacturers.

Referring to FIGS. 1 to 4 the vehicle chassis has a front compartment, shown as a driver's cab 1, mounted round the vehicle engine (not shown) on longitudinal chassis members 2 (FIG. 3) mounted on road wheels 3 and supporting the drive shaft 4. Onto this chassis is mounted a body 5 which can be living accommodation, a mobile workshop, a travelling shop or other utilizable space. An access opening 6 is provided in each of the rear of the cab and in the front of the body these openings being in register to permit free movement of personnel and/or goods between the cab and body interiors.

Figure 4:
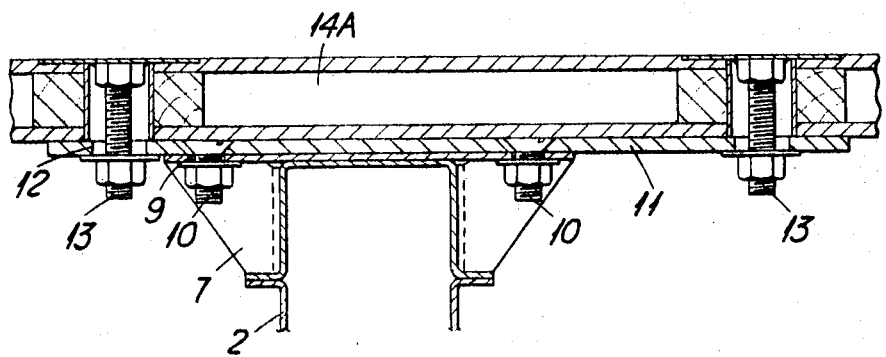
FIG. 4 shows the method of mounting the vehicle body on the chassis.
Figure 3:
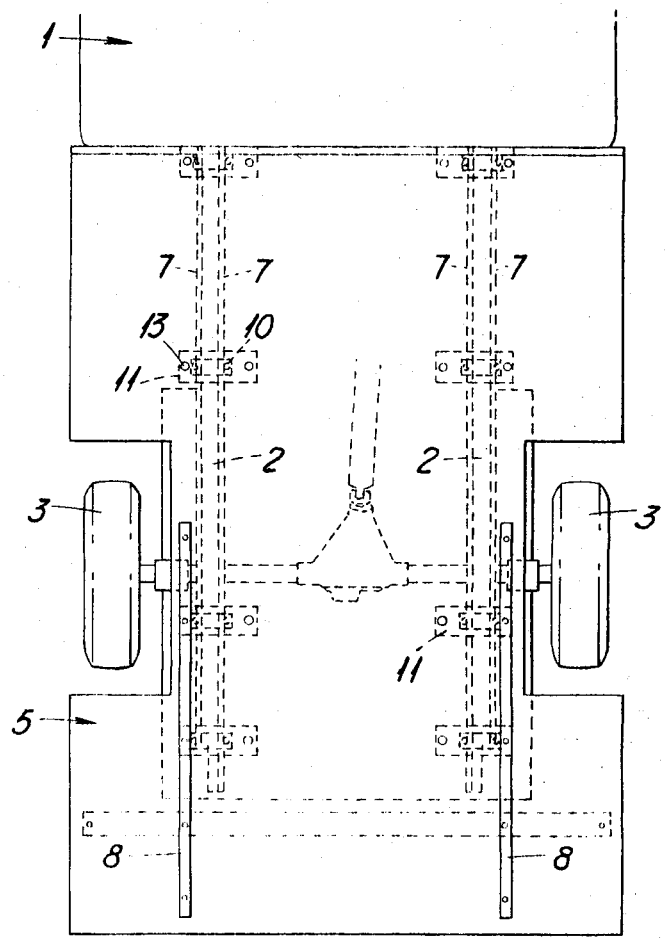
FIG. 3 is a plan view of the rear portion of the vehicle chassis showing the mounting of the body thereon.

As seen in FIGS. 3 and 4, the chassis members 2 have brackets 7 attached to them on either side to which the floor of the body is secured. The chassis members also have longitudinal rails 8 secured to their upper sides to assist in locating the body thereon. The brackets are bored with apertures 9 through which bolts 10 are secured to fix a tolerance plate 11 thereto; the apertures 9 are oblong permitting movement of the plate longitudinally of the vehicle before the bolts are fixed. The plate 11 has apertures 12 through which bolts 13 pass for securing the body floor 14 thereto, the apertures being oblong to permit movement between floor and plate transversely of the vehicle before the bolts 13 are tightened. By this means the body can be shifted slightly with respect to the chassis before it is finally fixed to the chassis, which is particularly useful as will be explained. The brackets 7 may be supplied with the body assembling kit of the invention or may be mounted on the members 2 by the vehicle manufacture, the apertures 9 being bored preferably by the body mounting operatives to suit the portion of the bolts 13 on the body.

Figure 2:
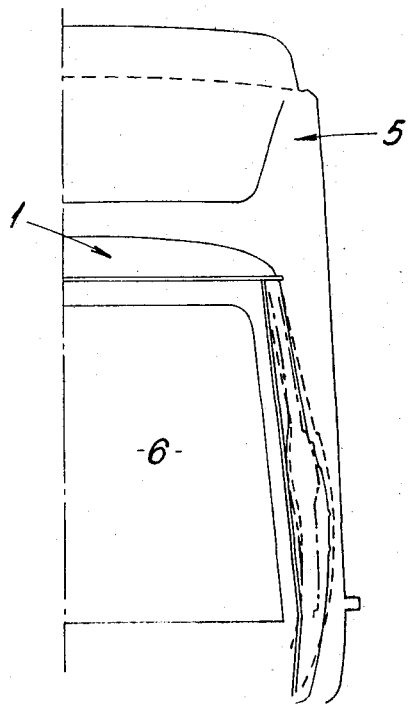
FIG. 2 is a front view looking from the left of FIG. 1 of half a vehicle with the different vehicle outlines.

Referring to FIGS. 1 and 2 these show in full lines the outline of one manufacturer's chassis, the dotted and chain dotted lines showing two other manufacturer's chassis. For each chassis shape the same box-like body is used and it can be seen that to make a weather-tight seal round the openings 6 is difficult prior to mounting the body on the chassis and after mounting the body access to the zone of the opening to provide a seal is equally difficult. This problem is different for different shapes of chassis cabs.

From FIGS. 5, 6 and 7 it can be seen that each cab has an access door in each side, part of which can be seen at 14. The doors are usually hinged at their forward edges and have rear edges 15 which with an interposed sealing strip (not shown) close against an upright 16 of the cab frame.

In FIG. 5 the upright 16 is a closed hollow prefabricated structure having the back wall 17 of sheet metal extending therefrom across the vehicle. This wall is provided with the opening 6, and the body 5 has a front wall 17 with a similar opening 6 in register therewith.

For assembling the body 5 to the cab of FIG. 5 a kit of parts is provided, comprising a make-up unit of two pieces 19, 20, clamping devices in the form of bolts 21 and an infill 22 formed of beads 23, 25 secured by nails 23A to pieces 19 and the body wall and a masking element 25. The piece 19 is shaped to be a snug fit against the front face of the cab wall 17 adjacent the opening 6 and has bolt holes 26 already bored therein to register with pre-bored holes 27 in the wall 17. The piece 19 is finished with a facing strip 28 if desired also bored to receive the bolt and nesting against the inside 29 of the upright 16. The piece 20 is shaped to be a snug fit, with the interposition of a sealing strip 30, against the rear face of the wall 17, and the rear face of the piece 20 is shaped to be a snug fit against the outer face of the front wall of the body 2 with the interposition of a sealing strip 31. The outer edge of the piece 20 is sealed by suitable sealing material 30A such as weatherproof aluminum paint which extends under the strips 30, 31. The piece 20 is bored at 32 to receive the bolts 21. The body wall 17 also has bolt holes 18 aligned with holes 27.

In assembly the body 5 is placed on the chassis members 2 and using the oblong holes 9 in the tolerance plate 11 can be shifted longitudinally and/or transversely of the vehicle to bring the bolt holes 26, 27, 32, 18 into register. The pieces 19, 20 are then placed in position, and the bolts 21 passed through all the parts; the nuts 33 are then screwed onto the bolts thus drawing all the parts tightly together so that the sealing material 30A makes a weather tight union. Finally the bolts 10, 13 are tightened which firmly fixes the body 5 on the chassis members 2.

The openings 6 in the cap and body are high enough for a person to pass through without undue difficulty and the pieces 19, 20 with the sealing parts thereof are of inverted U-shape to extend from the cab floor up the sides and over the top of the opening 6, bolts 6A being fixed at spaced intervals as seen in FIG. 2. The joint between the floors of body and cab at the apertures 6 can be sealed in any suitable way as by a grominet or a piece of floor covering.

The nuts 33 are preferably recessed into the floor as shown at 34 (FIG. 5) and the bolt heads 35 are rounded and have a washer 36 beneath them.

Referring to FIG. 6 the cab upright 16 has a different form from that in FIG. 5, and its outer part 37 forms part of the back wall 17 with a curved portion 38, shown in dotted lines. In this case the curved portion 38 between the straight portions 37 and 15 at points A to B is cut away to the full height of the opening 6 and the make-up unit is then built into the rear hollow part of the upright 16. This make-up unit comprises the channel section 39 and the pieces 40, 41, piece 40 being provided with holes in register with holes preformed in the portion 42 of section 39 and holes bored in upright 16 by the operative assembling the vehicle chassis and body, to receive the bolts 43. The section 39 has one arm 44 nesting against the part 37 and extending rearwardly and bent inwardly for securing by bolts 45 to the piece 41. This section 39 and the part 37 are covered by a sealing member 46 which may be an aluminum painted cover of metal, plastic or fabric, and forms a weathertight seal. The inner end of the piece 41 nests against the front face of the cab back adjacent the opening 6 and is enlarged at 47 adjacent the opening 6, with a slot 48 to receive the end 49 of the inwardly turned part 50 of the section 37. The end 49 and the piece 41 are prebored to receive a fixing bolt 21 as in FIG. 5, the wall 17 being bored by the assembling operative and a bolt 50 passing through a hole in the piece 41. The masking element 22 is the same as that in FIG. 5 and an additional seal 51 is secured between the strip 28 and the inner portion 52 of the upright 16; it may be prepainted metal or plastic strip such as a decorative vinyl material.

Referring to FIG. 7, this shows a vehicle cab upright 16 which is flat on its rear face with a rearwardly extending outer edge 53. In this case the make-up unit comprises a piece 54 with a shaped metal section 55, an innermetal section 56 and the pieces 47, 41 as in FIG. 5.

These parts extend the full height of the opening 6. The section 55 is secured to the edge 53 by bolts 53A or welding which the assembling operative applies. The section 56 is similarly secured at 57 to the front portion of the upright 16 and its rearward end is bent inwardly at 58 and bolted at 59, 60 to the piece 41. The pieces 47, 49 the facing strip 28, are bored to receive the clamping bolts 21 as in FIGS. 5 and 6 to pass through the body wall also. The masking element 22 may be as in FIGS. 5 and 6 or as shown of two elongated strips 61, 62 having overlapping flanges 63 which may be secured together or nailed to the piece 47 and the body wall and may have teeth or flanges 64 hammered into the piece 47 and body wall or a ram fit in slots therein. A seal strip 51 is also provided against the section 56.

Referring to FIG. 8 this shows a vehicle cab similar to that shown in FIG. 7 and the same references appear to the common parts as appear in the other drawings. The cab upright is shown at 16 but the portion 53A is slightly foreshortened longitudinally of the vehicle. The make-up unit comprises four blocks, 65, 66, 67 and 68 in that order starting from the front. The block 65 is shaped to nest against the inner side of the upright 16 and the block 66 nests against it and under the portion 53B of the upright 16; the block 67 nests against the block 66 behind the cover 46 and the block 68 nests on the outside against the cover 46 on the front side against the block 67 and on the rear side against the cover 28 which goes across the piece 41. The blocks 65 and 67 do not extend the full width transversely of the vehicle of the upright 16 to save material but the block 68 is full width to provide the support for the rear end of the sealing panel 51 secured to it by nails or screws 51A and by a rivet or screw or bolt to the portion 53C of the upright 16.

Thus the cover 46 provides a seal between the upright 16 and the forward end or bulkhead 17A of the body 5.

Figure 9:
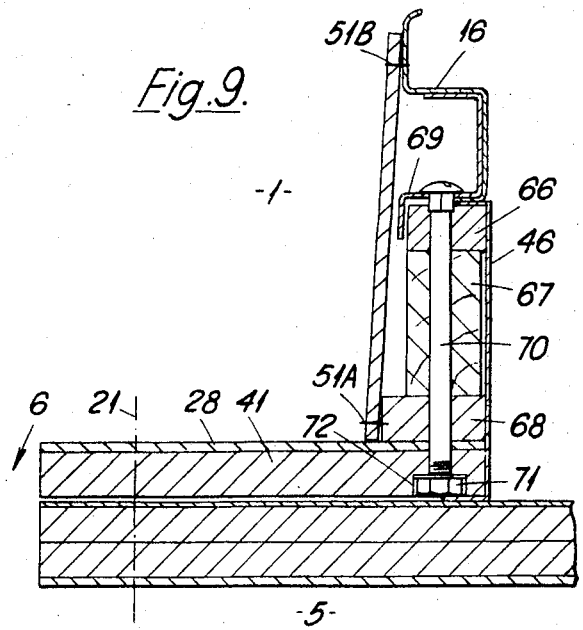
FIG. 9 is a cross-section of the construction in FIG. 8 but at a different height of the cab upright.

Referring to FIG. 9 this shows the same upright 16 in FIG. 8 but at a different height of the vehicle door wherein this construction the upright changes its configuration at different heights. The upright 16 at the level of FIG. 9 is of smaller construction than in FIG. 8 and its lower end 69 is return bent inwardly of the vehicle so that the blocks 65, 67 and 68 permitting the block 66 at that height, are contoured to nest between the portion 69 of the upright 16 and the cover 28. The whole is secured together by a bolt 70 the nut 71 of which nests in a recess 72 in the piece 41. At the inner side of the make-up piece where the opening 6 is arranged is covered by the sealing unit 22 as in FIG. 8 not shown in FIG. 9 and the bolt assembly of FIG. 8 is shown by the dotted line 21 in FIG. 9.

Figure 10:
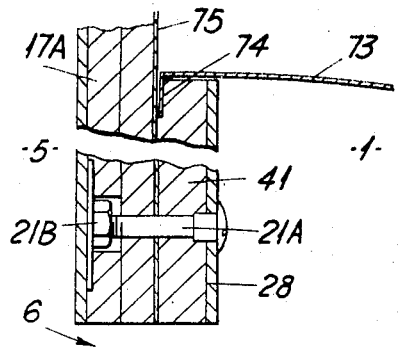
FIG. 10 is a cross section longitudinally of the vehicle showing the connection of the make-up unit to the cab roof.

Finally referring to FIG. 10 this shows in the cab of FIGS. 8 and 9 the roof 73 the rear end 74 of which is turned downwardly and engaged between the piece 41 and the end wall or bulkhead 17A of the vehicle body, a cover 28 being provided. The cover 28 piece 41 and wall 17A are bolted together by the bolt 21 A having a recessed nut 21B. A sealing strip 75 is provided over the front wall 17A and extends down between the wall and the portion 74 of the cab roof 73 thereby providing a weathertight seal.

In all the constructions the pieces 41, 47, 65 to 68 in their various forms shown in the drawings may be made of any suitable material for example woodblocks or plywood blocks. They may also be of other material such as plastics which can be bored or moulded with the borings in them or may receive nails or screws driven into them.

It will thus be seen that the kit may be prepared to suit any cab upright 16 configuration, which can where required be easily prepared to receive the kit parts by an unskilled operative. Thus the assembler has only to specify the make of vehicle and the body manufacturer can immediately supply a standard body and the kit of the invention for the specified vehicle, and the assembler can with ease assemble the vehicle. The assembled vehicle has a weathertight seal between the cab and the body with only a minimum loss of space between cab and body.

We claim:

1. For use in the assembly of a standardized vehicle body onto one of a number of vehicle chassis having driving compartments of different shape, with access openings provided in the front wall of said body and the rear wall of said driving compartment in register, a kit of parts comprising a make-up unit for disposition between said compartment and said body, said make-up unit having portions shaped on opposite faces to engage snugly against respective contours of the portions of said compartment and said body which bound the sides and top of said openings, slots in said make-up unit, a number of clamping devices each receivable in one of said slots to secure said body and compartment portions together with said make-up unit in a rigid and weather-tight structural connection, and a masking infill securable to the peripheral portions of said body, compartment and make-up unit around said access openings.

2. For use in the assembly of a vehicle body on one of a number of vehicle chassis with compartments of different shape with access openings in the contiguous ends of said body and said compartment in register, a kit of parts according to claim 1 wherein said make-up unit includes a number of pieces each shaped to the contour of the vehicle portion they are to engage on the sides and top of said compartment and body adjacent said access openings and frame uprights at the sides of said body, said clamping device slots through each said piece, said slots in different pieces being in register and in register with holes in said compartment and said body.

3. For use in the assembly of a vehicle body on one of a number of vehicle chassis with compartments of different shape with access openings in the contiguous ends of said body and said compartment in register, a kit of parts according to claim 1 wherein said make-up unit includes a structural element securable to the rear of said compartment upright to complete a rearwardly open portion thereof and form a portion completing the peripheral side and top portions of said access opening in said rear wall of said compartment, and at least one make-up piece shaped for engagement snugly against said structural element around said opening, said structural element having a number of clamping device slots therein each in register with such slots in said make-up piece.

4. For use in the assembly of a vehicle body on one of a number of vehicle chassis with compartments of different shape with access openings in the contiguous ends of said body and said compartment in register, a kit of parts according to claim 1 wherein said masking infill comprises beadings securable to the edge corners of around said access openings in said compartment and said body, and a masking element securable to and extending between said beadings.

* * * * *